Sept. 13, 1932.    C. BRIMER    1,877,548
PLANT COMPRESSING AND BINDING DEVICE
Filed June 19, 1931    4 Sheets-Sheet 1
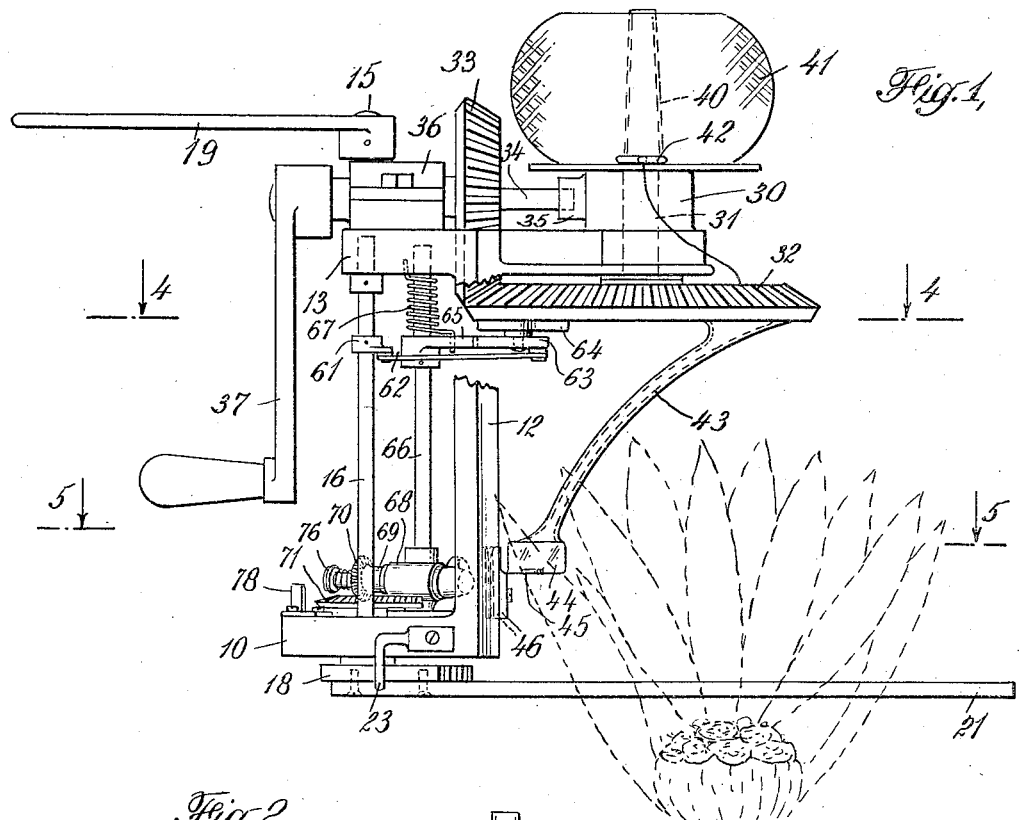
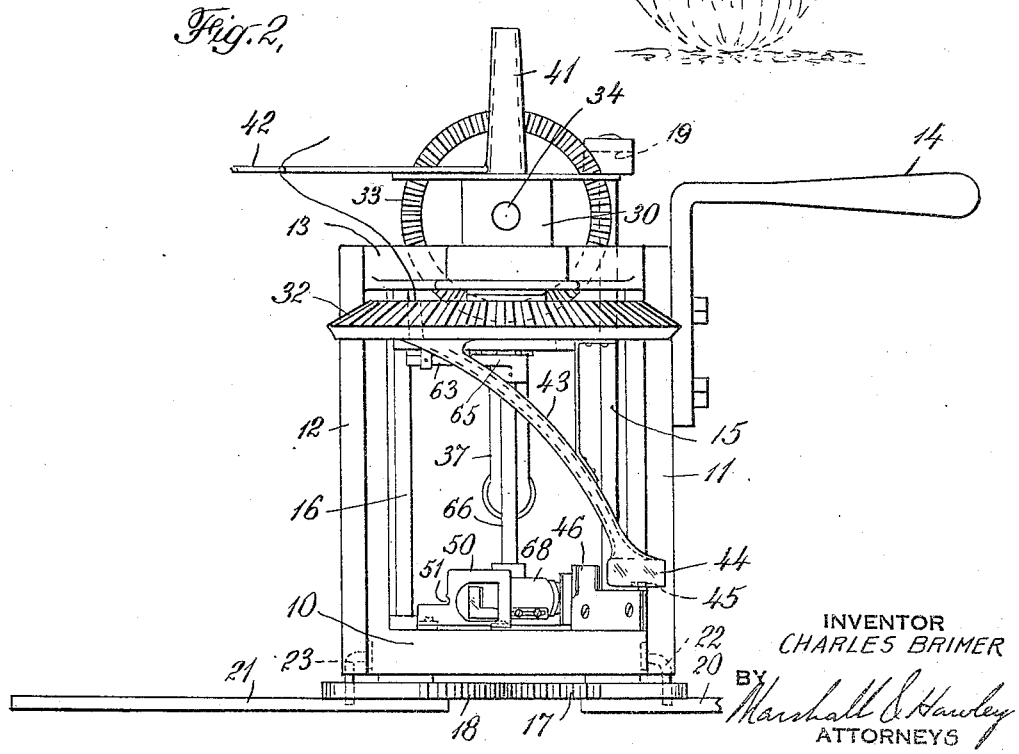
INVENTOR
CHARLES BRIMER Sept. 13, 1932.         C. BRIMER                  1,877,548
              PLANT COMPRESSING AND BINDING DEVICE
                   Filed June 19, 1931     4 Sheets-Sheet 2
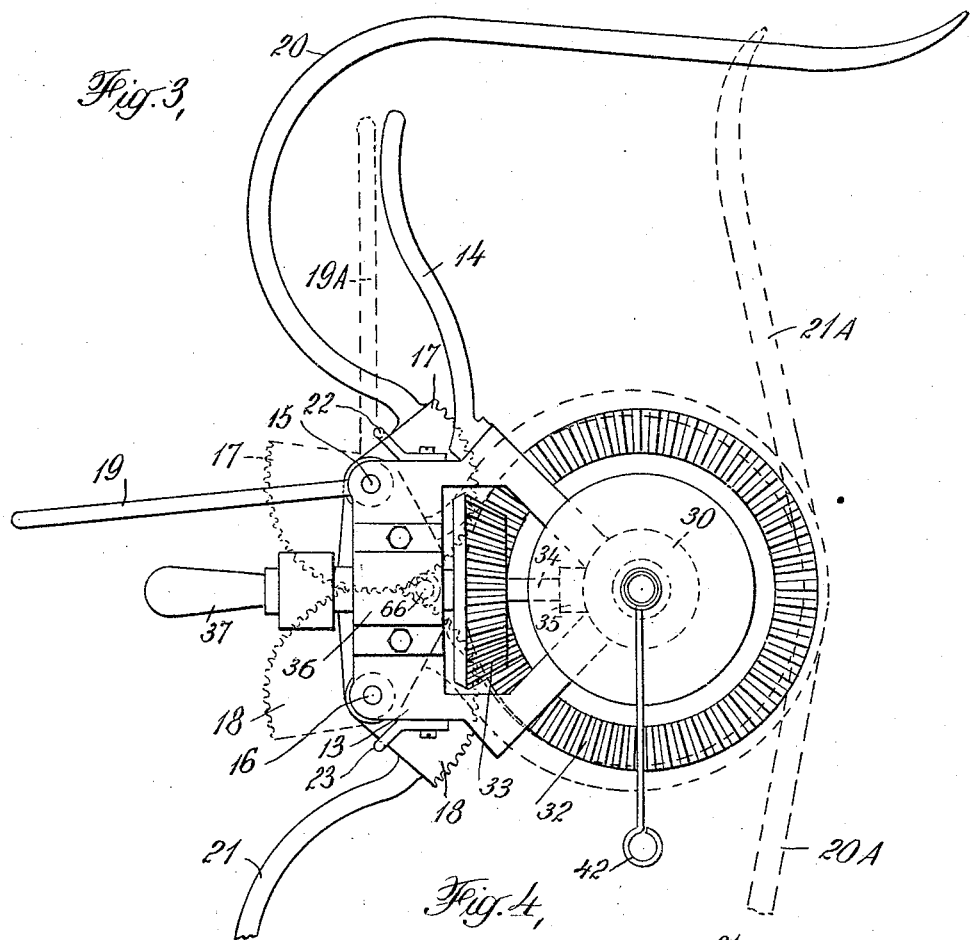
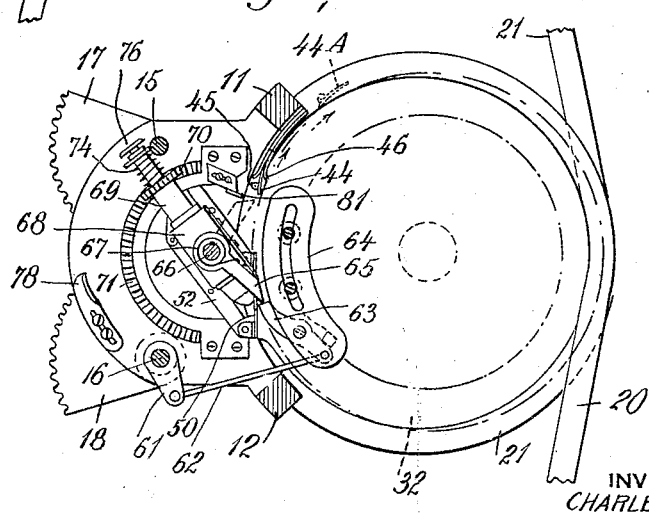
INVENTOR
CHARLES BRIMER

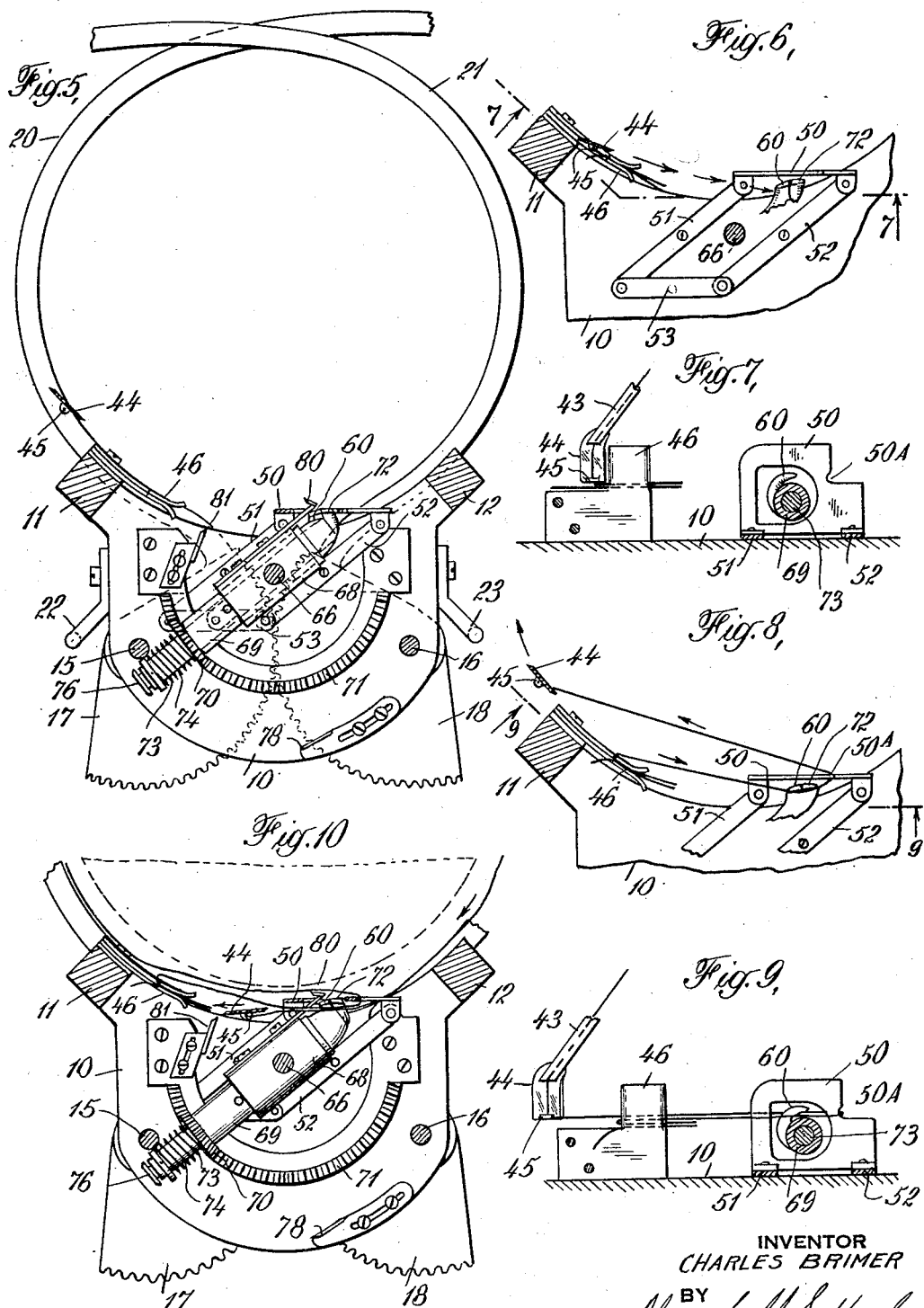

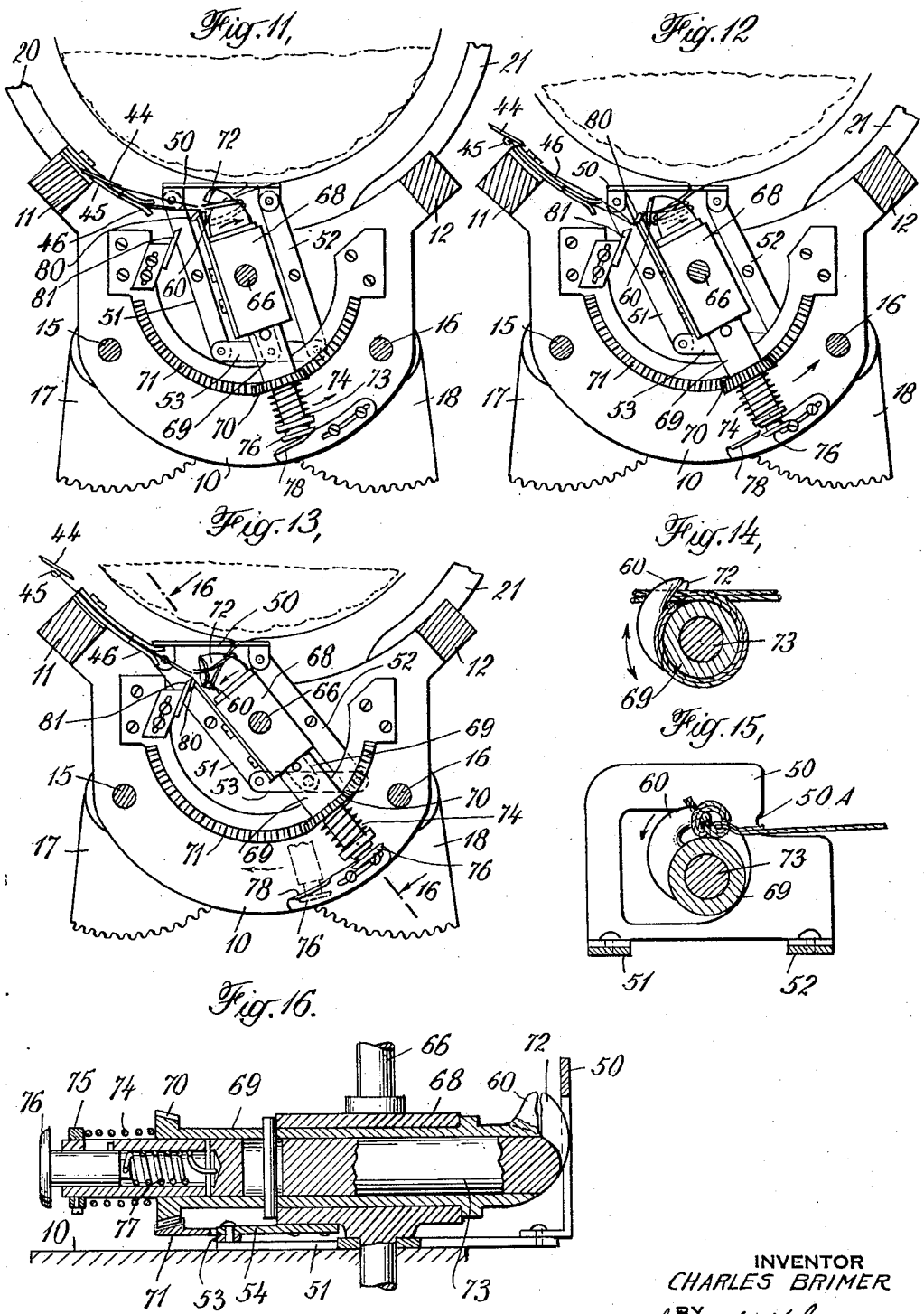

Patented Sept. 13, 1932

1,877,548

UNITED STATES PATENT OFFICE

CHARLES BRIMER, OF MARGARETVILLE, NEW YORK

PLANT COMPRESSING AND BINDING DEVICE

Application filed June 19, 1931. Serial No. 545,416.

This invention relates to improvements in plant compressing and binding devices, and its object is to provide a simple mechanism for the purpose of gathering together the leaves of a plant, for example, cauliflower, during its cultivation and binding them together by a twine passed around their petiola and tied. During the growth of such plants as cauliflower it is necessary, in order to produce the best results, to lift up their leaves and bunch them together in an upstanding position and to tie them together so that they will remain in that position during the continued growth of the plant. Heretofore this has had to be done by hand,—a laborious and time consuming operation.

The object of my invention is to provide a simple portable apparatus by means of which the various steps required to attain the desired result are done mechanically, with but little effort and with great rapidity.

These and other objects of the invention will appear in the following specification in which I will describe an illustrative embodiment of the invention, the novel features of which will be set forth in appended claims.

Referring to the drawings,

Fig. 1 is an elevation of a device which is made in accordance with my invention, positioned near a cauliflower plant which is represented in dotted lines;

Fig. 2 is another elevation of the device, the view being taken at right angles to that of Fig. 1;

Fig. 3 is a plan view of the same parts with its clamping arms shown in their distended position in full lines, together with their actuating connections and with the compressing position of the arms and their actuating connections indicated by dotted lines;

Fig. 4 is a sectional plan view, the section being taken on the line 4—4 of Fig. 1;

Fig. 5 is a sectional plan view on a larger scale showing the position of the parts at the beginning of the twin wrapping operation. The section in this figure is taken on the line 5—5 of Fig. 1;

Fig. 6 is a detail plan view of certain parts of the twine wrapping shown in the positions which they assume at the start of the twine carrying operation;

Fig. 7 is an elevation, partly in section, of parts of the twine wrapping mechanism, the view being taken on the line 7—7 of Fig. 6;

Fig. 8 is a plan view of the parts shown in Fig. 6 but shown in other relative positions;

Fig. 9 is an elevation, partly in section, of the parts shown in Fig. 8, the view being taken from the line 9—9 in the latter figure;

Fig. 10 is a plan view of the twine wrapping mechanism with the parts shown in the positions they assume at the end of the wrapping operation;

Figs. 11, 12 and 13 are plan views of the knotter mechanism with its parts shown in three successive operative positions;

Figs. 14 and 15 are sectional end elevations on a larger scale of the knot hook illustrating two of the positions it assumes successively when operated; and Fig. 16 is a sectional elevation of the knot hook and its associated parts.

Like characters of reference designate corresponding parts in the various figures of the drawings.

The device is assembled on a frame which comprises a base 10 and two uprights 11 and 12 at the upper ends of which is a head 13. A handle 14, by means of which the apparatus is supported, extends laterally from the head 13. The head and base form bearings for a pair of rotatable rods 15, 16 to the lower ends of which are affixed intermeshing segmental gears 17 and 18 respectively, under the base 10. 19 is a lever affixed to the upper end of rod 15. Extending from the segmental gears 17 and 18 are curved clamping arms 20 and 21. These are shown in full lines in Fig. 3 in their most distended position, which is limited by the edges of gears 17 and 18 coming in contact with stops 22, 23. The clamping arms are moved from their distended position into their clamping position, in which they are shown by dotted lines in Fig. 3 at 20A and 21A, by moving the lever 19 from its full line position toward the handle 14 to some such position as that indicated at 19A where it is shown by dotted lines.

A part of the head 13 forms a boss 30 through which passes the shaft 31 of a gear 32. A pinion 33 in mesh with gear 32 is affixed to a shaft 34 which is rotatably supported in a lug 35 projecting laterally from the boss 30 and in a bearing 36 on the head 13. The gear and pinion are rotated by a crank 37 affixed to the outer end of the shaft 34.

40 is a holder for a ball 41 of twine which is mounted upon an upstanding projection of the shaft 31 and is keyed to rotate with the shaft. 42 is a twine guide projecting from and rotating with the twine holder to lead the twine to a hole in gear 32. The twine passes through the gear and through a tubular member 43 on the end of which is a blade 44 having an eye 45 through which the twine is threaded. The blade is set at an angle to a tangent to the circumferential path through which it moves for a purpose which will appear presently.

The operation of wrapping the twine around the plant will now be described. The gear 32 is rotated by the crank 37 to cause the blade 44 to pass between a pair of spring clamps 46 which are mounted upon the upright 11 of the frame. In Figs. 6 and 7 the blade is shown as having just passed through the clamps. The gear is then reversed. The blade 44 then passes inside of the clamps 46 because of its angularity, carrying the twine in the direction indicated by the small arrows in Fig. 6, but leaving the end of the twine caught between the spring clamps. The rotation of the gear is continued until the plate 44 reaches the position in which it is shown in Figs. 8 and 9. Having passed outside of a perforated plate 50 and a hook 60, the purpose and function of which will be shown later, the twine will be caught by the plate and seated in a notch 50A therein, and by the hook 60, to form such a loop as is shown in Fig. 8.

With the twine wrapping parts thus positioned the device with its clamp arms 20, 21 distended is brought up to a plant, as shown in Fig. 1. Then lever 19 is moved toward handle 14 to move the clamping arms from the positions in which they are shown in full lines in Fig. 3 to some such positions as those indicated at 20A, 21A by dotted lines in the same figure. This gathers the leaves of the plant together and compresses them to the desired extent.

Next the gear 32 is rotated in a clockwise direction to carry the blade 44 from the position in which it is shown in Figs. 5, 8 and 9 and in dotted lines at 44A in Fig. 4, around the plant to bring another part of the twine back of hook 60.

The first time the twine is passed back of the hook 60 the latter remains in the position in which it is shown in Figs. 5-9. But after the clamping arms have been moved to enclose the plant an arm 61 on shaft 16 has, by means of a link 62, moved a cam 63 pivoted on a plate 64 which is adjustably mounted on the under side of gear 32 into position to engage a pawl 65. These parts are shown clearly in Figs. 1 and 4. Pawl 65 is keyed to and projects from a vertical shaft 66 which is rotated in a clockwise direction by a spring 67 (Fig. 1). 68 is a cylindrical housing on shaft 66 having a bore at right angles to the axis of this shaft. The hook 60 is formed on an end of a tubular member 69 which is rotatably mounted in the housing 68. 70 is a gear on the end of the member 69 in mesh with a segmental gear 71 affixed to the base 10. This arrangement is such that as the cam 63 pushes the pawl 65 to rotate shaft 66 about a substantially vertical axis against the action of the spring 67, it rotates the hook 60 about a substantially horizontal axis through about 360°. This winds the two parts of the twine around the member 69 back of the hook 60 in the form of a complete loop.

At the same time the plate 50 is moved with the hook to provide the slack in the twine needed to form the loop.

The plate 50 is mounted on the ends of parallel arms 51, 52 which are pivoted to the base 10, with their other ends connected by a link 53 which in turn is pivoted to an arm 54 projecting from the housing 68.

In the drawings, Fig. 10 shows the position of the hook 60 after two parts of the twine has been placed back of it. Fig. 11 shows the loop nearly completed. When in this position a finger 72 which has a configuration similar to that of hook 60 has been pushed away from the hook in the following manner: the finger 72 is on the end of a rod 73 which is slidably but non-rotatively mounted in the tubular member 69. A spring 74 interposed between the gear 70 and a collar 75 affixed to the outer end of the rod 73 tends to keep the finger 72 in clamping engagement with the hook 60. 76 is a button having a stem telescopically supported on rod 73 and pushed outwardly by a spring 77 (see Fig. 16). When the parts have reached the positions in which they are shown in Fig. 11, the button 76 has engaged a stationary cam 78 on the base 10 which has forced the finger 72 away from the hook 60 against the action of spring 74 so that as the hook completes the formation of the loop the two parts of the twine which extends to the left of the loop, as viewed in the drawings, will lie between the end of hook 60 and the finger 72.

Further rotation of the shaft 66 will bring the parts to the positions in which they are shown in Fig. 12. Here the button 76 has passed the cam 78 and the spring 74 has moved the finger 72 back against the hook clamping the parts of the twine which are between them. This is also shown in Fig. 14. At the same time a knife 80 which is attached to the housing 68 has been moved up to the twine, on the other side of which is a stationary blade 81.

Further rotation of shaft 66 brings the parts to the positions shown in Fig. 13 where the knife 80 and blade 81 have severed the twine. The blade 44 has also carried the end of the twine from the eye 45 through the clamps 46, ready for repeating the operation.

Now as the gear 32 is rotated in the opposite direction to release the pawl 65, the shaft 66 will be turned back by its spring 67. Spring 77 now pushes the button 76 outside of cam 78 so that the ends of the twine remain clamped between the hook 60 and the finger 72 as the loop is withdrawn from the hook, as shown in Fig. 15, thus completing the knot.

The foregoing description is for illustrative purposes as many modifications and variations may be made within the spirit and scope of my invention and I intend no limitations other than those imposed by the appended claims.

What I claim is:

1. A portable device comprising a frame, a pair of plant clamping arms pivoted to the frame, manual means for actuating said clamping arms, means for wrapping a twine around a plant held within the clamping arms, a knot tying mechanism and gearing for actuating the wrapping means and the knot tying mechanism.

2. A portable device comprising a frame, a pair of plant clamping arms pivoted to the frame, means for causing said arms to move simultaneously, a lever for actuating said moving means, means for wrapping a twine around a plant near the clamping arms, a knot tying mechanism, gearing for actuating the wrapping means and the knot tying mechanism, and manual means for actuating the gearing.

3. A portable device comprising a frame, a pair of intermeshing gears pivoted to the frame, a plant clamping arm projecting from each of said gears, a lever connected with one of the gears, a rotary mechanism for wrapping a twine around a plant near the clamping arms, manual means for actuating said twine wrapping mechanism, and means actuated by the movement of the twine wrapping mechanism for tying a knot in the twine.

4. A portable device comprising a frame, a pair of intermeshing gears pivoted to the frame, a plant clamping arm projecting from each of said gears, a lever connected with one of the gears, a rotary mechanism for wrapping a twine around a plant near the clamping arms, manual means for actuating said twine wrapping mechanism, and means actuated by the movement of the twine wrapping mechanism for severing the twine and tying a knot in the twine.

5. A portable device comprising a frame having a base and a head spaced therefrom, a pair of projecting arms pivoted to the base, a gear supported in the head, means for moving the clamping arms to compact the leaves of a plant, and a twine guide depending from the edge of the gear for leading a twine around a plant held within the clamping arms.

6. A portable device comprising a frame having a base and a head spaced therefrom, a hand projecting laterally from the upper part of the frame, a pair of projecting plant clamping arms pivoted to the base, a gear supported in the head, a lever projecting laterally from the upper part of the frame for moving the clamping arms to compact the leaves of a plant, and a twine guide depending from the edge of the gear for leading a twine around a plant held within the clamping arms.

7. A portable device comprising a frame having a base and a head spaced therefrom, a handle projecting laterally from the upper part of the frame, a pair of projecting plant clamping arms pivoted to the base, a gear supported in the head, a lever projecting laterally from the upper part of the frame for moving the clamping arms to compact the leaves of a plant, a twine guide depending from the edge of the gear for leading a twine around a plant held within the clamping arms, a pinion engaging said gear having a shaft supported on the head of the frame, and a crank on the pinion shaft.

8. A portable device comprising a frame having a base and a head spaced therefrom, a handle projecting laterally from the upper part of the frame, a pair of projecting plant clamping arms pivoted to the base, a gear supported in the head, a lever projecting laterally from the upper part of the frame for moving the clamping arms to compact the leaves of a plant, means for supporting a ball of twine above the gear, means near the base of the frame for holding the end of the twine, a twine guide depending from the edge of the gear for leading the twine around a plant held within the clamping arms, a pinion engaging said gear having a shaft supported on the head of the frame, and a crank on the pinion shaft.

9. A portable device comprising a frame having a base and a head spaced therefrom, a pair of projecting clamping arms pivoted to the base, a gear supported in the head, means for moving the clamping arms to compact the leaves of a plant, a twine guide depending from the edge of the gear for leading a twine around a plant held within the clamping arms, and means for tying the twine.

10. A portable device comprising a frame having a base and a head spaced therefrom, a handle projecting laterally from the upper part of the frame, a pair of projecting plant clamping arms pivoted to the base, a gear supported in the head, a lever projecting laterally from the upper part of the frame for moving the clamping arms to compact the leaves of a plant, a twine guide depending from the edge of the gear for leading a twine around a planet held with the clamping arms, and a knot tying mechanism for the twine.

11. A portable device comprising a frame having a base and a head spaced therefrom, a handle projecting laterally from the upper part of the frame, a pair of projecting plant clamping arms pivoted to the base, a gear supported in the head, a lever projecting laterally from the upper part of the frame for moving the clamping arms to compact the leaves of the plant, a twine guide depending from the edge of the gear for leading a twine around a plant held within the clamping arms, a pinion engaging said gear having a shaft supported on the head of the frame, a crank on the pinion shaft, a knot tying mechanism, and means for actuating said mechanism by the movement of said gear.

12. A portable device comprising a frame having a base and a head spaced therefrom, a handle projecting laterally from the upper part of the frame, a pair of projecting plant clamping arms pivoted to the base, a gear supported in the head, a lever projecting laterally from the upper part of the frame for moving the clamping arms to compact the leaves of a plant, means for supporting a ball of twine above the gear, means near the base of the frame for holding the end of the twine, a twine guide depending from the edge of the gear for leading the twine around a plant held within the clamping arms, a pinion engaging said gear having a shaft supported on the head of the frame, a crank on the pinion shaft, a mechanism for severing the twine near the holding means therefor and for tying a knot in the twine, and means for actuating said mechanism by the movement of said gear.

CHARLES BRIMER.